United States Patent [19]

Kusaka

[11] Patent Number: 5,485,001

[45] Date of Patent: Jan. 16, 1996

[54] FOCUS DETECTING APPARATUS

[75] Inventor: Yosuke Kusaka, Yokohama, Japan

[73] Assignee: Nikon Corporation, Tokyo, Japan

[21] Appl. No.: 103,513

[22] Filed: Aug. 9, 1993

[30] Foreign Application Priority Data

Aug. 18, 1992 [JP] Japan .................................. 4-219090

[51] Int. Cl.$^6$ ............................ G01J 1/20; G01C 3/00
[52] U.S. Cl. ................. 250/201.8; 354/406; 354/407; 354/408
[58] Field of Search ................ 250/201.8; 354/406, 354/407, 408

[56] References Cited

U.S. PATENT DOCUMENTS

| | | | |
|---|---|---|---|
| 4,562,346 | 12/1985 | Hayashi et al. | 250/201 |
| 4,857,718 | 8/1989 | Karasaki et al. | 250/201 |

FOREIGN PATENT DOCUMENTS

| | | | |
|---|---|---|---|
| 54-159259 | 12/1979 | Japan . | |
| 4-214514 | 8/1992 | Japan . | |

*Primary Examiner*—William L. Sikes
*Assistant Examiner*—Fetsum Abraham
*Attorney, Agent, or Firm*—Shapiro and Shapiro

[57] ABSTRACT

A focus detecting apparatus has a photo-taking optical system for forming an object image on a prospective focal plane, and a focus detector for detecting the focus adjusted state of the photo-taking optical system in the plurality of areas of the prospective focal plane. The focus detector comprises a plurality of focus detecting units for detecting the focus adjusted states of the plurality of areas. At least two of the plurality of focus detecting units differ in the construction of the focus detecting optical system thereof from each other. Preferably, one of the focus detecting units is a unit of the pupil division re-imaging type including at least one pair of re-imaging optical elements for detecting the focus state of a focus detection area set on the center of the prospective focal plane and a pair of light receiving element arrays for receiving the images thereof, and another one of the focus detecting units is a focus detecting unit of the pupil division non-re-imaging type comprising a set of a plurality of lenslets for deteting the focus state of a focus detection area set on the marginal portion of the prospective focal plane and a pair of light receiving elements corresponding to the respective lenslets.

7 Claims, 7 Drawing Sheets

FOCUS DETECTING APPARATUS

BACKGROUND OF THE INVENTION

1. Field of the Invention

This invention relates to a focus detecting apparatus in a camera or the like.

2. Related Background Art

There is known a focus detecting apparatus of the pupil division imaging type in which an object image formed by a pair of light beams coming from the pair of different areas of the exit pupil of a photo-taking optical system is formed as a pair of object images on the pair of light receiving portions of a sensor by a focus detecting optical system having a pair of re-imaging lenses, a pair of object image signals produced by the sensor are calculation-processed to thereby calculate the amount of relative deviation of the pair of object images and the defocus amount between the imaging plane of the photo-taking optical system and the surface of film is detected on the basis of said amount of deviation.

This system has a merit that highly accurate focus detection can be effected by the pitch of sensor pixels for spatially sampling the re-imaged object being made fine, but it suffers from a demerit that a relatively large space is required for re-imaging the object image.

There is also known a focus detecting apparatus of the pupil division type but yet of the non-re-imaging type disclosed in Japanese Laid-Open Patent Application No. 54-159259. In this system, the shape of a pair of light receiving elements is projected onto the photo-taking optical system side by a plurality of minute lenses (lenslets) disposed near the surface of film and the pair of light receiving elements disposed behind them to thereby effect pupil division and the object image is spatially sampled by the plurality of lenslets, and the amount of relative deviation of the set of outputs of one of the pair of light receiving elements and the set of outputs of the other of the pair of light receiving elements is calculated, and the defocus amount between the imaging plane of the photo-taking optical system and the surface of the film is detected on the basis of said amount of deviation.

This system has a merit that a relatively small space is only required because it is not necessary to re-image the object image, but it suffers from a demerit that it is technically difficult to make the pitch of the lenslets for spatially sampling the object image fine and insensitive zones are created between the lenslets and therefore highly accurate focus detection cannot be effected.

Where a plurality of focus detection modules of said pupil division re-imaging type are disposed in the photographing image field to effect focus detection in the plurality of areas of the photographing image field, highly accurate focus detection can be effected in each focus detection area, but since a very large space is required, it has been impossible to make a camera body or the like containing the plurality of focus detection modules therein into a practically reasonable size.

Also, where a plurality of focus detection modules of said pupil division non-re-imaging type are disposed in the photographing image field to effect focus detection in the plurality of areas of the photographing image field, it is possible to make a camera body or the like containing the plurality of focus detection modules therein into a practically reasonable size, but it has been impossible to effect highly accurate focus detection in each focus detection area.

SUMMARY OF THE INVENTION

The present invention solves the above-noted problems of the space in the camera body and focus detection accuracy by properly using the above-described two focus detection systems in conformity with the positions of the focus detection areas when focus detection is effected in the plurality of areas of the photographing image field.

The focus detecting apparatus of the present invention has a photo-taking optical system for forming an object image on a prospective focal plane, a first focus detection module of the pupil division re-imaging type including a pair of re-imaging optical elements for forming at least one pair of images for detecting the focus state of a focus detection area set on the center of the prospective focal plane and a pair of light receiving element arrays for receiving said pair of images, and a second focus detection module of the pupil division non-re-imaging type comprising a plurality of lenslets for detecting the focus state of a focus detection area set on the marginal portion of the prospective focal plane and a plurality of sets of a pair of light receiving elements corresponding to said lenslets.

In the present invention, when focus detection is to be effected at a plurality of locations on the photographing image field, the focus detection accuracy at the center of the photographing image field can be maintained by the above-described construction, and focus detection is made possible even in the marginal portion of the photographing image field while the space remains small.

DETAILED DESCRIPTION OF THE PREFERRED EMBODIMENTS

Some embodiments of the present invention will hereinafter be described with reference to the drawings.

Figure 1:
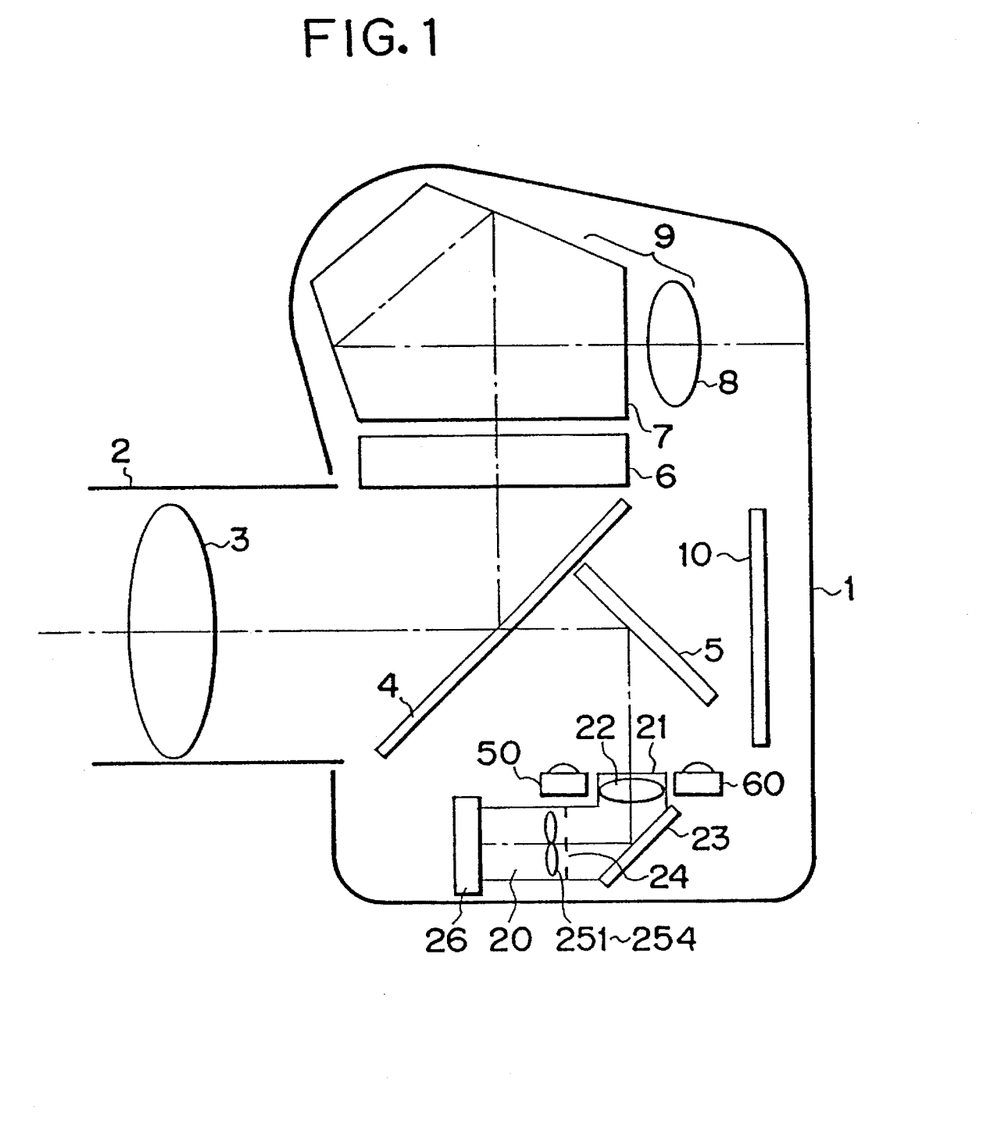
FIG. 1 shows a camera including a focus detecting apparatus according to an embodiment of the present invention, and corresponds to a cross-section on the line 1—1 of FIG. 7.

FIG. 1 shows the construction of an embodiment in which the present invention is applied to an interchangeable lens camera system.

A lens 2 is interchangeably designed with respect to a body 1, and FIG. 1 shows a state in which the lens 2 is mounted on the body 1.

There is a photo-taking optical system 3 in the lens 2, and a light beam from an object passing through the phototaking optical system 3 is divided toward a sub-mirror 5 and a finder 9 comprising a screen 6, a pentagonal prism 7 and an eyepiece 8, by a main mirror 4 comprised of a half mirror.

A light beam deflected from the direction of a shutter 10 toward the bottom of the body by the sub-mirror 5 is directed to a plurality of focus detection members 20, 30, 40, 50 and 60 to be described which are disposed in the prospective focal plane 8 of the photo-taking optical system 3.

Figure 7:
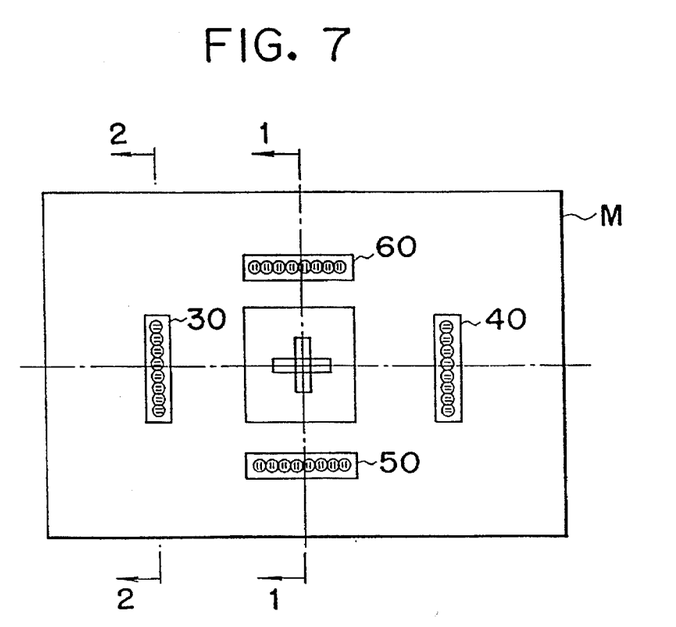
FIG. 7 shows the arrangement of focus detection modules of the pupil division re-imaging type.

The focus detection module 20 is a focus detection module of the pupil division re-imaging type, and is disposed so as to effect the focus detection of the center of a photographing image field M as shown in FIG. 7.

The focus detection modules 30, 40, 50 and 60 are focus detection modules of the pupil division non-re-imaging type using the aforedescribed lenslets, and are disposed so as to effect the focus detection of the marginal portion of the photographing image field M as shown in FIG. 7.

Figure 8:
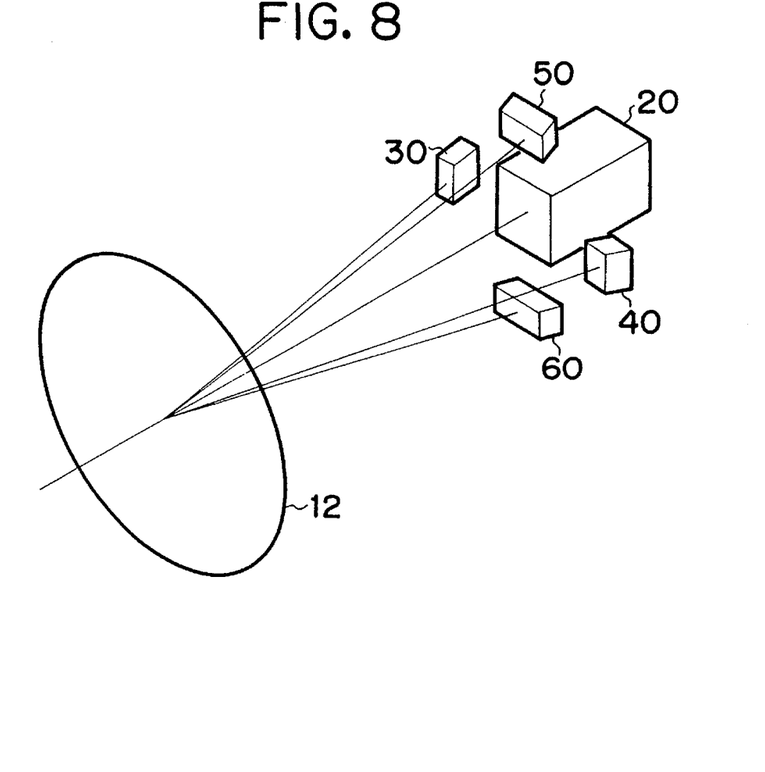
FIG. 8 shows the positional relation between each focus detection module and the pupil of a photo-taking optical system.

FIG. 8 is a perspective view showing the positional relation between each focus detection module and the pupil 12 of the photo-taking optical system. On the optical axis of the photo-taking optical system 3, there is disposed the focus detection module 20 of the pupil division re-imaging type occupying a large space but high in focus detection accuracy, and off the optical axis, there are disposed the focus detection modules 30, 40, 50 and 60 of the pupil division non-re-imaging type not high in focus detection accuracy, yet occupying small spaces, so as to surround the focus detection module 20.

As shown in FIGS. 7 and 8, the direction of arrangement of the lenslets of the focus detection modules 30, 40, 50 and 60, i.e., the direction of the focus detection area, is disposed in a circumferential direction centering around the optical axis, whereby the arrangement of the focus detection modules 20, 30, 40, 50 and 60 as a whole becomes good and the space can be effectively used.

Figure 2:
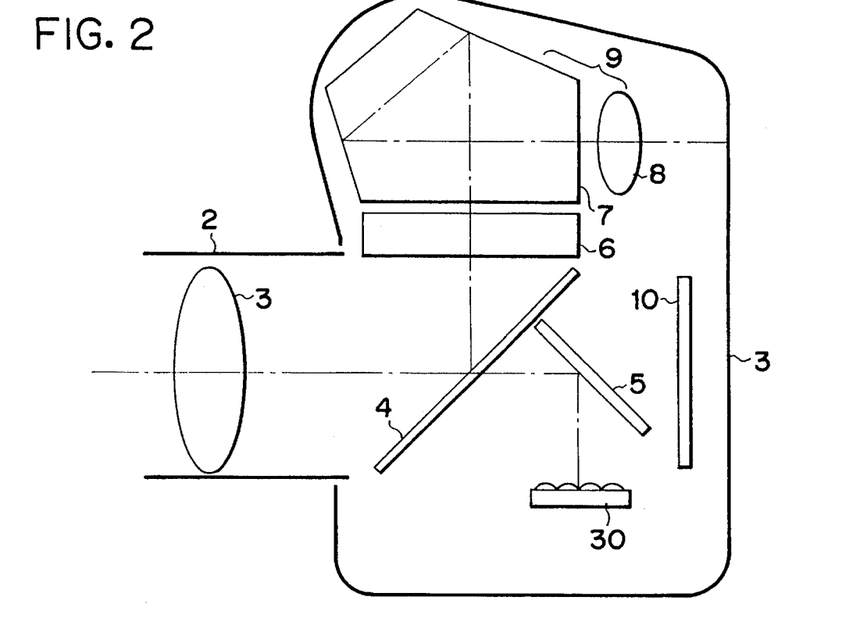
FIG. 2 shows the camera of FIG. 1 and corresponds to a cross-section on the line 2—2 of FIG. 7.

FIG. 1 is a cross-sectional view along the line A of FIG. 7, and FIG. 2 is a cross-sectional view along the line B of FIG. 7. In FIG. 1, the focus detection module 20 of the pupil division re-imaging type comprises a field mask 21, a condenser lens 22, a mirror 23, a stop mask 24, re-imaging lenses 251–254 and a sensor 26, and a light beam passed through the condenser lens 22 is deflected toward the sensor 26 by the mirror 23 so as to become parallel to the optical axis of the photo-taking optical system 3. Thereby the height of the body 1 is prevented from becoming great.

Figure 4:
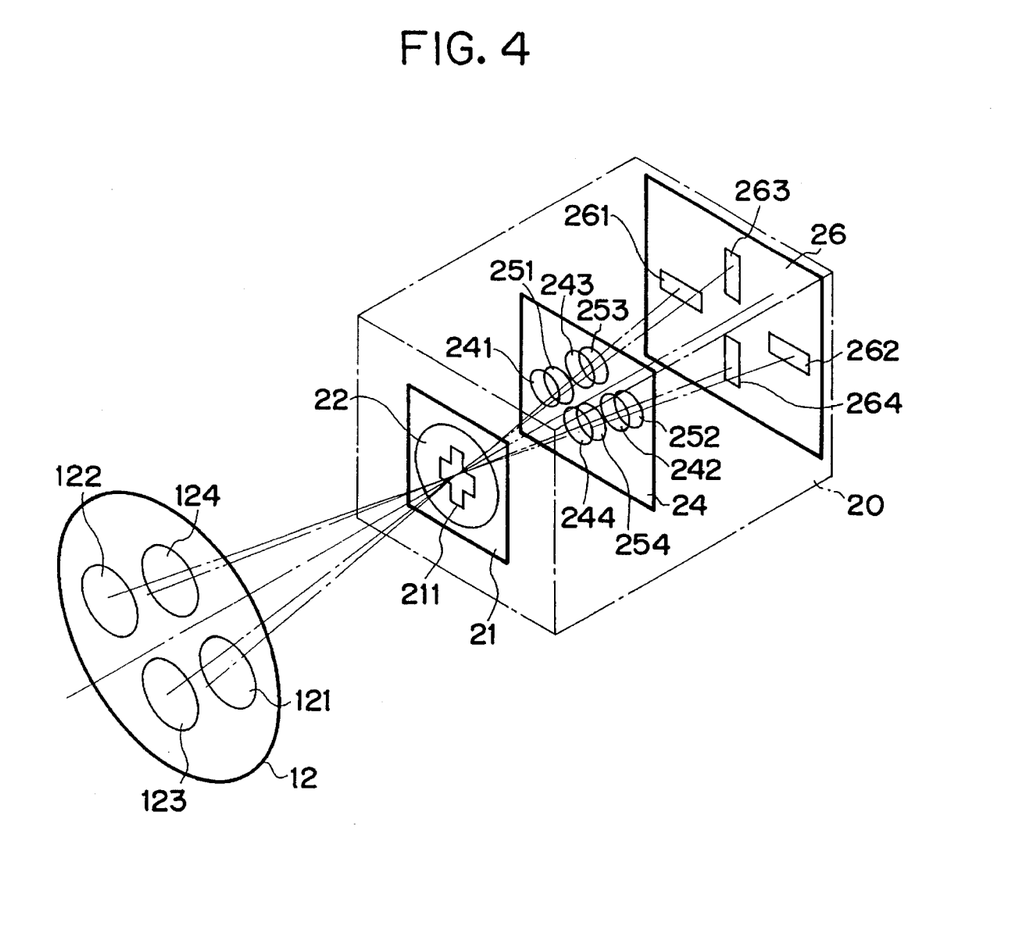
FIG. 4 shows the construction of a focus detection module of the pupil division re-imaging type.

FIG. 4 shows the more detailed construction of the focus detection module 20 of the pupil division re-imaging type.

The focus detection module 20 comprises the field mask 21 having a cruciform opening 211, the condenser lens 22, the stop mask 24 having two pairs of stop openings 241, 242, 243, 244, a focus detecting optical system comprising two pairs of re-imaging lenses 251, 252, 253, 254, and the sensor 26 such as a CCD having two pairs of light receiving portions 261, 262, 263, 264, and a primary image formed by the photo-taking optical system 3 is re-imaged as two pairs of secondary images on the two pairs of light receiving portions 261, 262, 263, 264. The light receiving portions 261, 262, 263, 264 each is comprised of a plurality of pixels.

Also, the opening 211 in the field mask is disposed on the optical axis near the prospective focal plane and thus, a focus detecting position is set on the image field.

In the construction as described above, the two pairs of stop openigns 241, 242, 243, 244 are projected onto the two pairs of areas 121, 122, 123, 124 of a surface 12 near the exit pupil of the photo-taking optical system 3 which are symmetrical with respect to the optical axis, by the condenser lens 22, and light beams passing through these areas first form a primary image near the field mask 21. The primary image formed in the opening 211 in the field mask 21 further passes through the condenser lens 22 and the two pairs of stop openings 241, 242, 243, 244, and is formed as two pairs of secondary images on the two pairs of light receiving portions 261, 262, 263, 264 of the sensor 26 by the two pairs of re-imaging lenses 251, 252, 253, 254.

The intensity distributions of the two pairs of secondary images are photoelectrically converted by the light receiving portions 261, 262, 263, 264 and become electrical object image signals.

As is well known, the relative positional relation between the two pairs of secondary images on the sensor 26 in the direction of arrangement of the two pairs of light receiving portions is detected by the use of the object image signals produced by the sensor 26, whereby the defocus amount of the imaging plane and prospective focal plane of the photo-taking optical system 3 can be detected.

The focus detection module 20 highly accurately detects the defocus amount in the focus detection areas in the vertical and horizontal directions set on the optical axis of the photographing image field in the manner described above.

Figure 5:
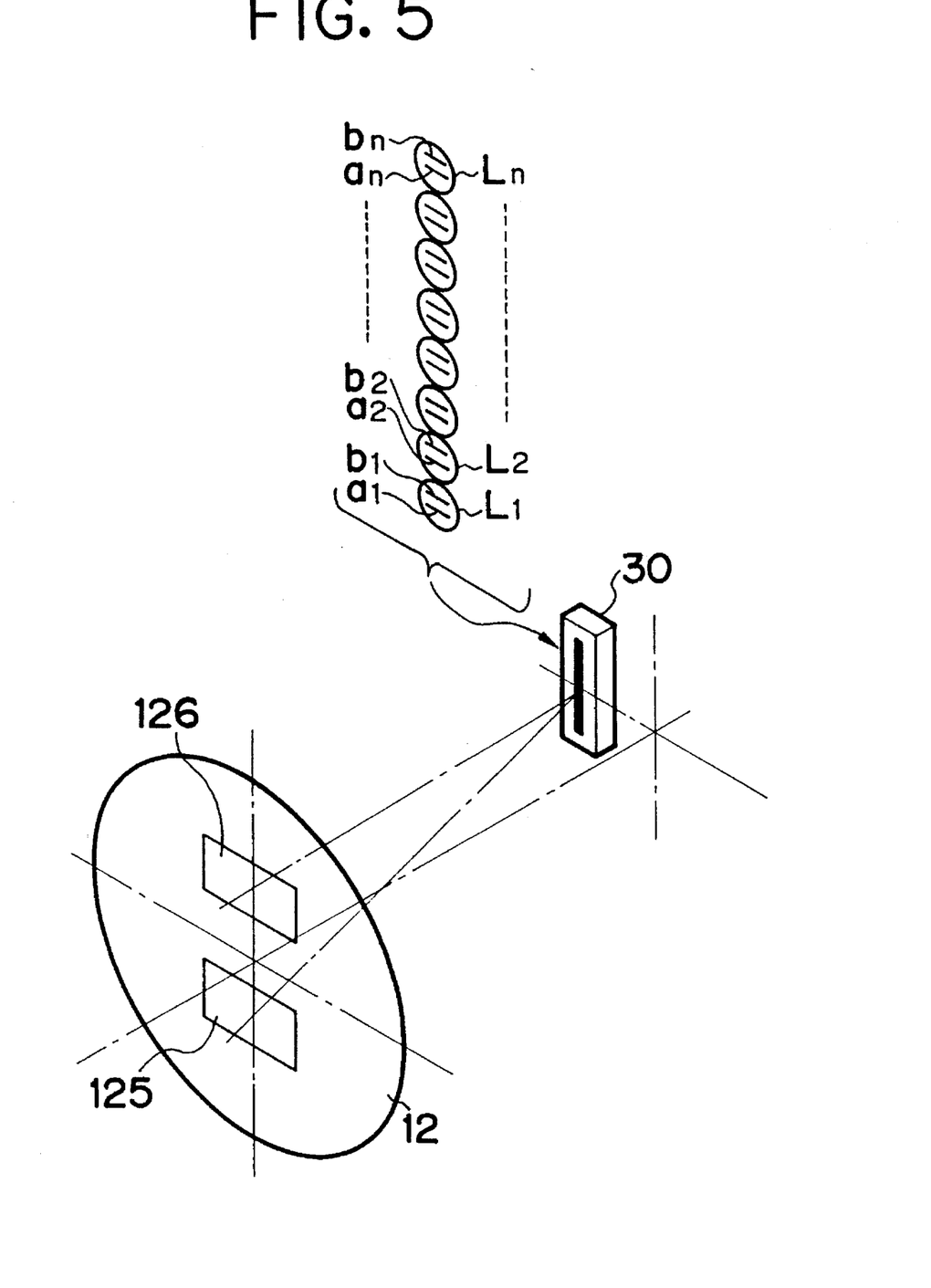
FIG. 5 shows the construction of a focus detection module of the pupil division non-re-imaging type.

FIG. 5 shows the more detailed construction of the focus detection module 30 of the pupil division non-re-imaging type.

The focus detection module 30 is comprised of one-dimensionally arranged lenslets L1, L2, . . . , Ln (referred to as the lenslet 31 as a whole) and pixel pairs (a1, b1), (a2, b2), . . . , (an, bn) (referred to as the sensor 32 as a whole) disposed behind them in the direction of their arrangement, and this module as a whole is disposed off the optical axis of the photo-taking optical system 3 and effects the focus detection of the marginal portion of the photographing image field.

In the construction as described above, as shown in FIG. 6, the lens lets L1, L2, . . . , Ln project the pixel shapes of the pixel pairs (a1, b1), (a2, b2), . . . , (an, bn) disposed behind them onto a pair of areas 125 and 126 of the surface 12 near the exit pupil of the photo-taking optical system 3 which are symmetrical with respect to the optical axis, and light beams passing through these areas first form a primary image near the lenslets. Thus, the object image is spatially sampled by the lenslets.

Figure 6:
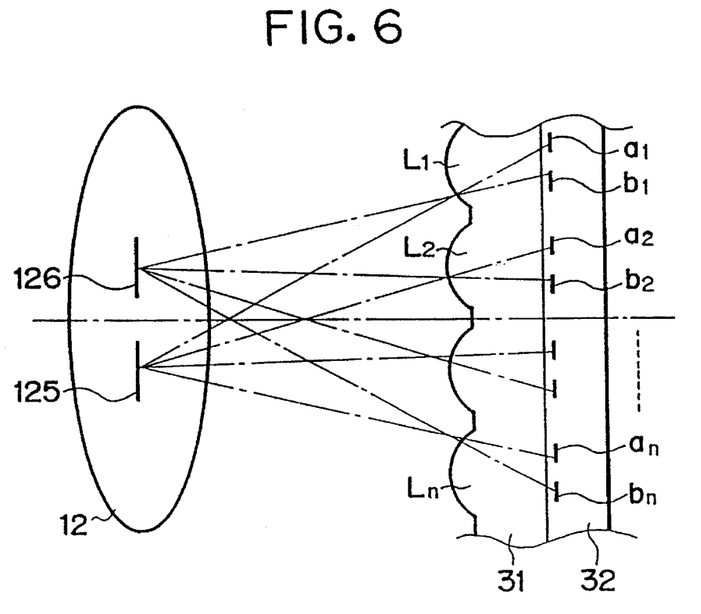
FIG. 6 is an enlarged view of the lenslets and pixel portions of FIG. 5.

Also, the light beam passing through the area 125 is received by one of the pixel pairs, a1, a2, . . . , an and the light beam passing through the area 126 is received by the other of the pixel pairs, b1, b2, . . . , bn and therefore, by detecting the relative positional relation between the pair of pixel outputs (a1, a2, . . . , an) and (b1, b2, . . . , bn), the defocus amount of the imaging plane and prospective focal plane of the photo-taking optical system 3 can be detected. The focus detection module 30 detects the defocus amount in the focus detection area set off the axis of the photographing image field in the manner described above.

When focus detection is actually effected, optimum one of the results of detection by all of the plurality of focus detection modules constructed as described above may be automatically selected (for example, by adopting a defocus amount indicative of the closest distance), or the plurality of focus detection modules may be manually selected by the photographer. If in the latter case, high focus detection accuracy is required, the central focus detection module can be selected.

Figure 9:
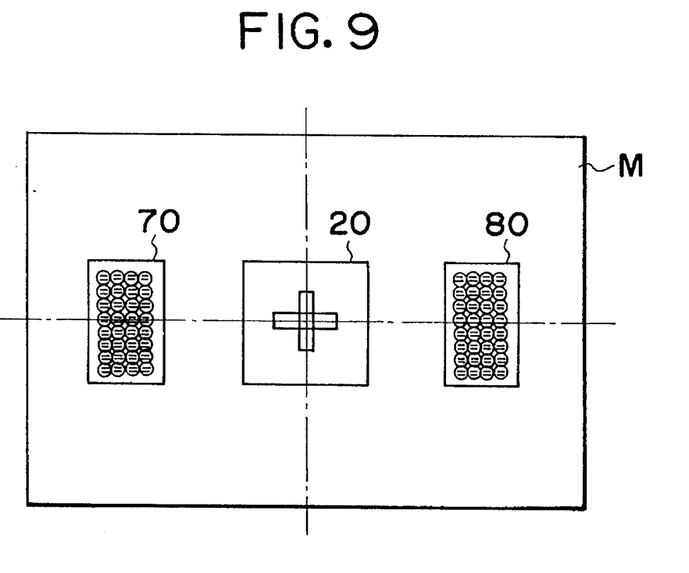
FIG. 9 shows the construction of another focus detection module.

In the above-described embodiment, the focus detection module of the pupil division non-re-imaging type disposed in the marginal portion of the photographing image field comprises one-dimensionally arranged lenslets, and it is very easy as compared with an optical system of the pupil division re-imaging type to integrate a plurality of such modules, and the increase in space is small and therefore, as shown in FIG. 9, focus detection modules 70 and 80 in which lenslets are formed integrally in a plurality of rows may be disposed in the marginal portion of the photographing image field.

Figure 3:
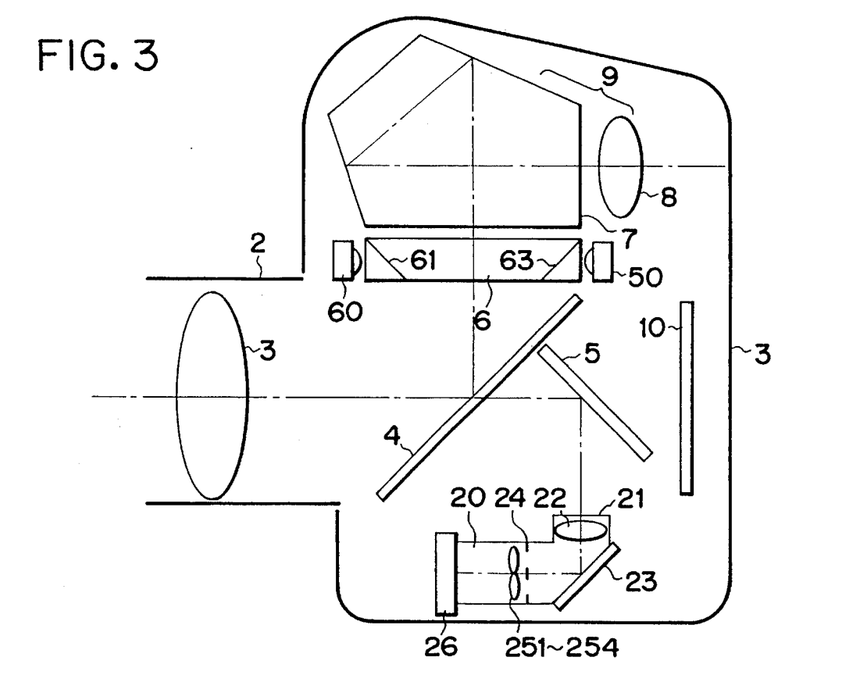
FIG. 3 shows another embodiment of the present invention.

FIG. 3 shows another embodiment of the present invention in which the focus detection module of the pupil division non-re-imaging type disposed at the bottom of the body for the focus detection in the marginal portion of the photographing image field in the above-described embodiment is disposed in the finder 9.

Figure 10:
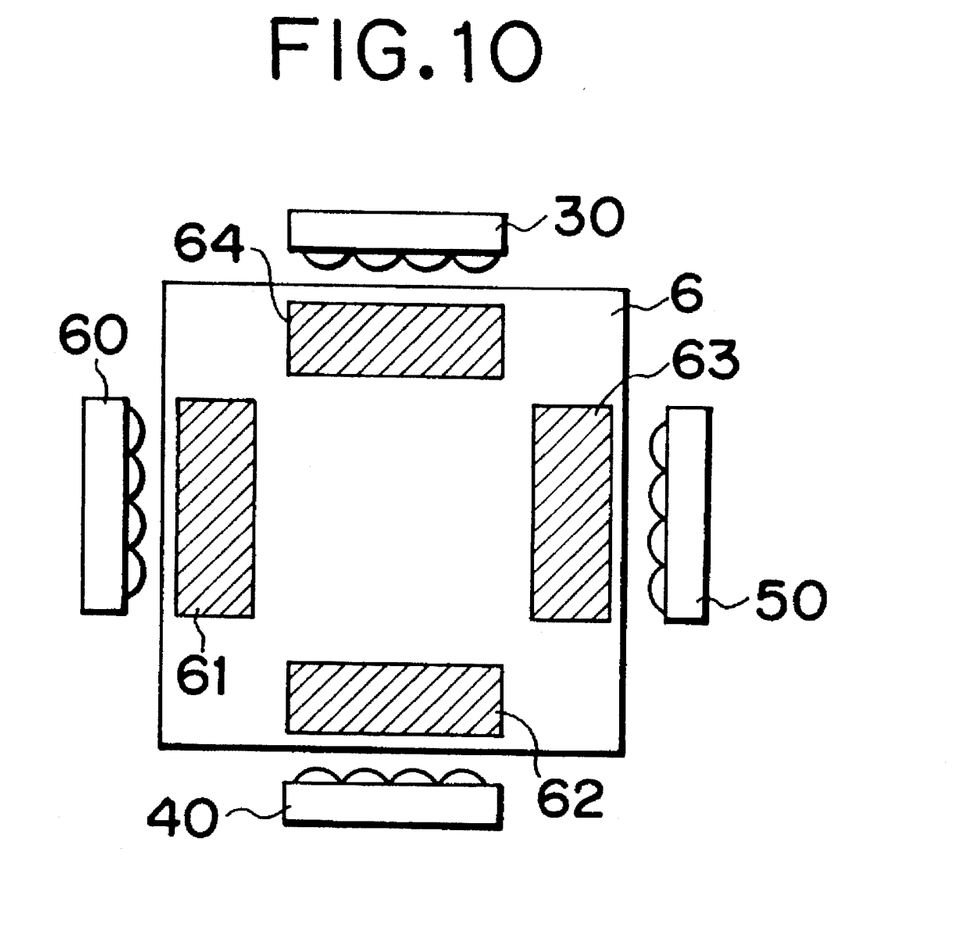
FIG. 10 is a view of a screen as it is seen from above it.

FIG. 10 shows the screen 6 as it is seen from above it. Half mirrors 61, 62, 63 and 64 are formed on the screen 6 and deflect parts of the incident light beam toward the edge portions of the screen 6. Focus detection modules 30, 40, 50 and 60 of the pupil division non-re-imaging type are disposed on the four sides of the screen 6, and the focus detection of the focus detection areas in the marginal portion of the photographing image field which are prescribed by the half mirrors 61, 62, 63 and 64 can be effected by the use of the light beams deflected by the half mirrors 61, 62, 63 and 64.

In such a case, the positions of the lenslets in the direction of the optical axis become somewhat offset from the prospective focal plane, but the amount of such offset can be added to the detected defocus amount to thereby effect correction.

Generally, space is small in the finder and there is no room for incorporating a focus detection module of the pupil division re-imaging type therein and therefore, it is the optimum combination to incorporate a focus detection module of the pupil division re-imaging type in the bottom of the body and incorporate a focus detection module of the pupil division non-re-imaging type in the finder.

In such a construction, the space at the bottom of the body can be used for other function than focus detection, and this is advantageous. Also, by the finder 9 in which the focus detection module of the pupil division non-re-imaging type is incorporated being made interchangeable relative to the body 1, the finder can be interchanged as required for the focus detection in the marginal portion of the photographing image field, and the usability of the finder is improved.

As described above, according to the present invention, a focus detecting apparatus capable of effecting focus detection at a plurality of positions in the photographing image field can be contained in a camera or the like without being made bulky, and at the same time, the requirement for strict focus detection accuracy can be coped with by the central focus detection module and thus, space and accuracy can be made compatible.

What is claimed is:

1. A focus detecting apparatus comprising:
    a photo-taking optical system for forming an object image on a prospective focal plane;
    a first focus detection module of the pupil division re-imaging type including a pair of re-imaging optical elements for forming at least one pair of images to detect the focus state of a focus detection area set on the center of said prospective focal plane, and a pair of light receiving element arrays for receiving said pair of images; and
    a second focus detection module of the pupil division non-re-imaging type including a plurality of lenslets for detecting the focus state of a focus detection area set on the marginal portion of said prospective focal plane, and a pair of light receiving elements corresponding to said lenslets.

2. A focus detecting apparatus according to claim 1, wherein said second focus detection module has a focus detection area extending in one direction which coincides with the circumferential direction of a circle centering around the optical axis of said photo-taking optical system on the prospective focal plane.

3. A focus detecting apparatus according to claim 1, further comprising a finder for observing therethrough the object image formed by said photo-taking optical system, and a dividing mirror for dividing a light beam passed through said photo-taking optical system and supplying it to said finder, and wherein said second focus detection module effects focus detection by the light beam divided by said dividing mirror and supplied to said finder, and said first focus detection module effects focus detection by the other light beam than the light beam divided by said dividing mirror and supplied to said finder.

4. A focus detection apparatus comprising:
    a photo-taking optical system for forming an object image on a prospective focal plane; and
    focus detecting means for detecting the focus adjusted state of said photo-taking optical system in the plurality of areas of said prospective focal plane;
    said focus detecting means comprising a plurality of focus detecting units for detecting the focus adjusted states of said plurality of areas;
    said plurality of focus detecting units each being provided with a focus detecting optical system, dividing said photo-taking optical system into a pair of different pupil portions by said focus detecting optical systems, and detecting the relative positional relation between a pair of object images formed by a pair of light beams passing through said different pupil portions in a direction perpendicular to the optical axis of said photo-taking optical system to thereby detect the focus state of said photo-taking optical system;
    at least two of said plurality of focus detecting units differing in the construction of the focus detecting optical system from each other.

5. A focus detecting apparatus according to claim 4, wherein the focus detecting optical systems of said plurality of focus detecting units include an optical system of the type which re-images a primary image formed on the prospective focal plane into a secondary image, and an optical system of the type which does not re-image the primary image formed on the prospective focal plane into a secondary image.

6. A focus detecting apparatus according to claim 5, wherein the focus detecting optical system of the focus detecting unit effecting the focus detection of the central area of the prospective focal plane is an optical system of the type which re-images the primary image formed on the prospective focal plane into a secondary image, and the focus detecting optical system of the focus detecting unit effecting the focus detection of the marginal area of the prospective focal plane is an optical system of the type which does not re-image the primary image formed on the prospective focal plane into a secondary image.

7. A focus detecting apparatus according to claim 6, wherein said focus detecting means is incorporated in a camera having a half mirror for dividing a light beam passing through the photo-taking optical system into a light beam to a finder for observing the object image therethrough and other light beam, the focus detecting unit provided with the focus detecting optical system of the type which re-images the primary image formed on said prospective focal plane into a secondary image effects focus detection by the use of said other light beam, and the focus detecting unit provided with the focus detecting optical system of the type which does not re-image the primary image formed on said prospective focal plane into a secondary image effects focus detection by the use of the light beam divided to the finder.

* * * * *